(12) United States Patent
Hull et al.

(10) Patent No.: US 11,447,035 B1
(45) Date of Patent: Sep. 20, 2022

(54) BATTERY SYSTEM OPTIMIZATION FOR EVTOL AIRCRAFT

(71) Applicant: Textron Innovations Inc., Providence, RI (US)

(72) Inventors: Michael Raymond Hull, Fort Worth, TX (US); Steven Loveland, Keller, TX (US); Yue Fan, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/307,998

(22) Filed: May 4, 2021

(51) Int. Cl.
| | |
|---|---|
| *B60L 58/21* | (2019.01) |
| *H02J 7/00* | (2006.01) |
| *B64D 27/24* | (2006.01) |
| *B64D 31/06* | (2006.01) |
| *B64C 29/00* | (2006.01) |
| *B60L 50/64* | (2019.01) |
| *B60L 58/14* | (2019.01) |

(Continued)

(52) U.S. Cl.
CPC .............. *B60L 58/21* (2019.02); *B60L 50/64* (2019.02); *B60L 53/53* (2019.02); *B60L 58/14* (2019.02); *B60L 58/15* (2019.02); *B64C 29/0033* (2013.01); *B64D 27/24* (2013.01); *B64D 31/06* (2013.01); *H02J 7/0013* (2013.01); *H02J 7/0029* (2013.01); *H02J 7/007182* (2020.01); *B60L 2200/10* (2013.01); *B60L 2210/10* (2013.01); *B64D 2221/00* (2013.01); *H02J 2207/20* (2020.01)

(58) Field of Classification Search
CPC .......... B60L 58/21; B60L 50/64; B60L 53/53; B60L 58/15; B60L 58/14; B60L 2210/10; H02J 7/007182; H02J 7/0013; H02J 7/0029; H02J 2207/20; B64C 29/0033; B64D 27/24; B64D 31/06; B64D 2221/00
USPC ......................................................... 307/9.1
See application file for complete search history.

(56) References Cited

U.S. PATENT DOCUMENTS

| | | |
|---|---|---|
| 8,469,306 B2 | 6/2013 | Kuhn, Jr. |
| 2017/0072812 A1* | 3/2017 | Von Novak ....... H01M 10/4257 |

(Continued)

OTHER PUBLICATIONS

European Exam Report; Application No. EP21185924.4; European Patent Office; dated Jan. 11, 2022.

(Continued)

*Primary Examiner* — Rexford N Barnie
*Assistant Examiner* — Swarna N Chowdhuri
(74) *Attorney, Agent, or Firm* — Lawrence Youst PLLC

(57) ABSTRACT

An electrical system provides propulsive power to a rotor system of an eVTOL aircraft. The electrical system includes a power battery system having a plurality of power cells and a power battery management system. An energy battery system includes a plurality of energy cells and an energy battery management system in communication with the power battery management system. A distribution system electrically couples the power battery system and the energy battery system to at least one electric motor that drives the rotor system. In a takeoff and landing power mode of the eVTOL aircraft, both the power battery system and the energy battery system provide electrical power to the at least one electric motor. In a cruise power mode of the eVTOL aircraft, the energy battery system provides electrical power to the at least one electric motor and to the power battery system to recharge the power cells.

20 Claims, 10 Drawing Sheets

(51) Int. Cl.
  *B60L 58/15*  (2019.01)
  *B60L 53/53*  (2019.01)

(56) References Cited

U.S. PATENT DOCUMENTS

| | | | |
|---|---|---|---|
| 2017/0203850 A1* | 7/2017 | Wang | B64C 39/024 |
| 2018/0339781 A1* | 11/2018 | Vander Lind | H01M 10/441 |
| 2019/0100303 A1 | 4/2019 | Campbell | |
| 2019/0241274 A1* | 8/2019 | Hunkel | B64D 35/08 |
| 2021/0320353 A1* | 10/2021 | Miftakhov | H01M 10/46 |
| 2022/0009625 A1* | 1/2022 | Bower | B64C 29/0033 |

OTHER PUBLICATIONS

European Search Report; Application No. EP21185924.4; European Patent Office; dated Dec. 17, 2021.

* cited by examiner

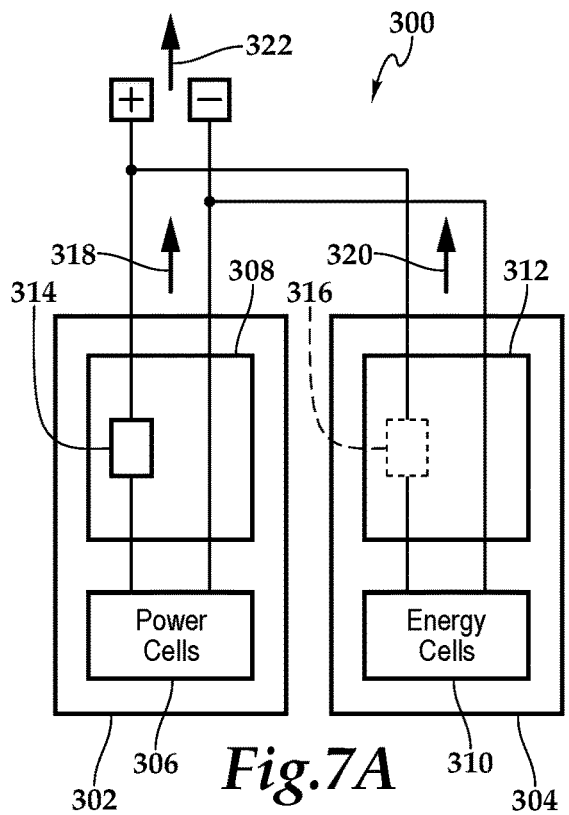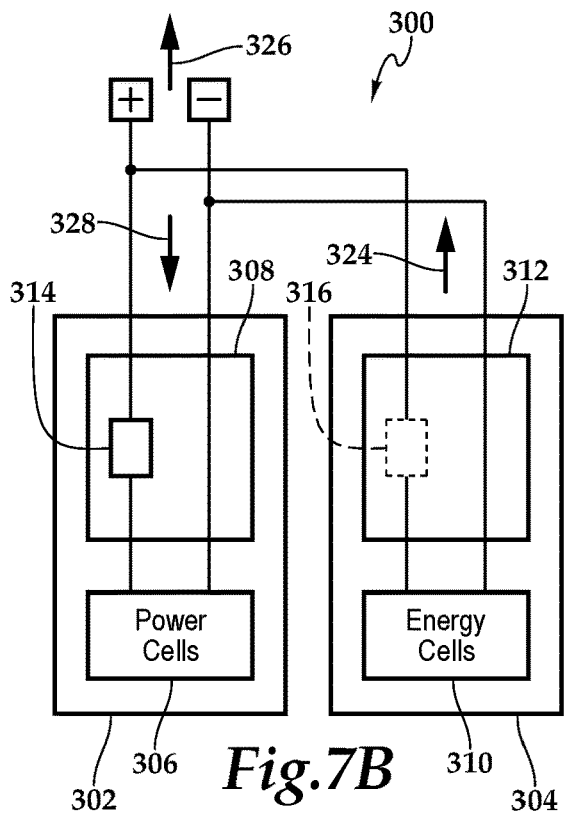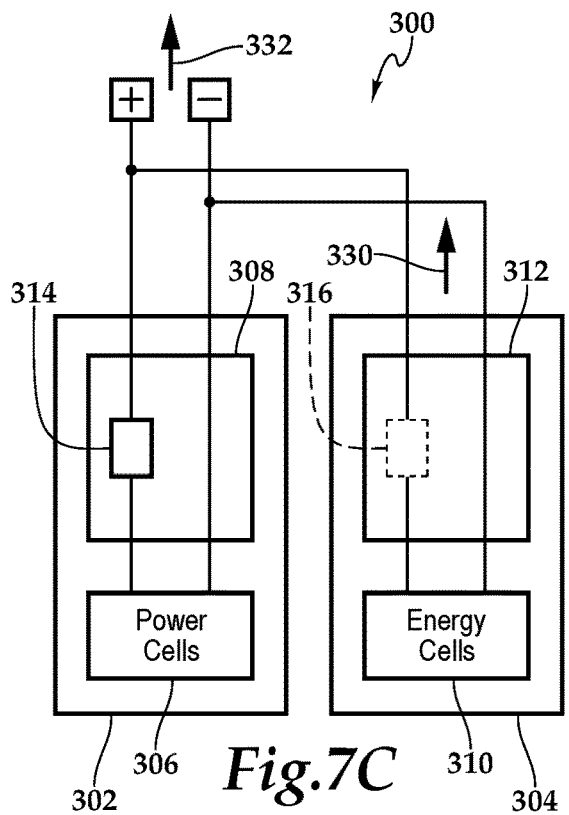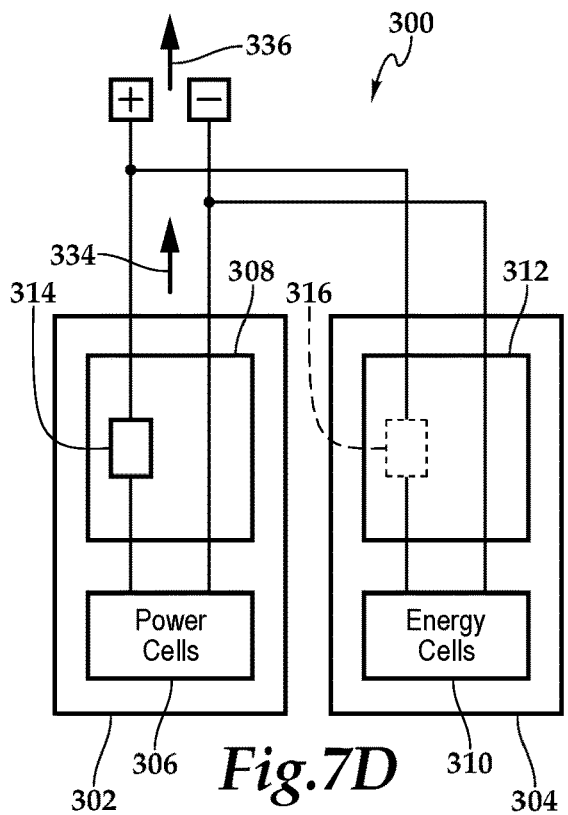

BATTERY SYSTEM OPTIMIZATION FOR EVTOL AIRCRAFT

TECHNICAL FIELD OF THE DISCLOSURE

The present disclosure relates, in general, to battery systems configured to provide electrical power for the propulsion of eVTOL aircraft and, in particular, to the optimization of battery systems that include power battery cells and energy battery cells that selectively provide electrical power for the propulsion of eVTOL aircraft.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that, in forward flight, produces low pressure on the upper surface and high pressure on the lower surface to generate the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and limitations of advancing blade Mach number.

Tiltrotor aircraft, which are another example of VTOL aircraft, attempt to overcome these drawbacks by utilizing proprotors that can change their plane of rotation based on the operation being performed. Tiltrotor aircraft typically have two or more proprotors mounted near the outboard ends of a fixed wing. The proprotors are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Electric vertical takeoff and landing (eVTOL) aircraft utilize electricity to power the various systems of the aircraft including the propulsion system. It has been found, however, that eVTOL aircraft require a disproportionate amount of electrical power during certain high power demand maneuvers including takeoff, hover and landing operations as compared to other phases of flight such as cruising in forward flight. Attempts have been made to compensate for the disproportionate power consumption during transient high power demand maneuvers including using an oversized battery array. It has been found, however, that the use of such an oversized battery array increases the overall weight and cost of the aircraft while also reducing flight payload and/or aircraft range. Accordingly, a need has arisen for improved battery systems for eVTOL aircraft that overcome the disproportionate power consumption during transient high power demand maneuvers while not reducing the flight payload and/or the aircraft range.

SUMMARY

In a first aspect, the present disclosure is directed to an electrical system configured to provide propulsive power to a rotor system of an eVTOL aircraft having a takeoff and landing power mode and a cruise power mode. The electrical system has a power battery system that includes a plurality of power cells and a power battery management system. The electrical system also has an energy battery system that includes a plurality of energy cells and an energy battery management system that is in communication with the power battery management system. At least one electric motor is configured to drive the rotor system. A distribution system electrically couples the power battery system and the energy battery system to the at least one electric motor. In the takeoff and landing power mode, both the power battery system and the energy battery system provide electrical power to the at least one electric motor. In the cruise power mode, the energy battery system provides electrical power to the at least one electric motor and to the power battery system to recharge the power cells.

In some embodiments, the power battery management system may be configured to provide short circuit protection, over-charge protection, over-discharge protection and over-current protection to the power cells. In certain embodiments, the energy battery management system may be configured to provide short circuit protection, over-discharge protection and over-current protection to the energy cells. In some embodiments, the power battery management system may include a controller configured to allow discharge of the power cells during the takeoff and landing power mode and to selectively allow charging of the power cells during the cruise power mode. In such embodiments, the controller may include a switch configured to selectively connect and disconnect electrical communication with the power cells such as an electromechanical switch or a solid state switch. In some embodiments, the controller may include a voltage regulator such as a DC-to-DC converter. In certain embodiments, the energy battery management system may include a controller. In such embodiments, the controller may include a voltage regulator such as a DC-to-DC converter.

In certain embodiments, a voltage of the power battery system in a fully charged state may be greater than a voltage of the energy battery system in a fully charged state. In some embodiments, in the cruise power mode, the energy battery system may provide electrical power to the power battery system to recharge the power cells when a voltage of the energy battery system is greater than a voltage of the power battery system. In certain embodiments, the voltage of the energy battery system in the fully charged state may be greater than the voltage of the power battery system in the fully charged state. In some embodiments, in the takeoff and landing power mode, the power battery system may provide electrical power to the at least one electric motor when a voltage of the distribution system droops to match the voltage of the power battery system. In certain embodiments, a distribution voltage of the distribution system and an operating voltage of the at least one electric motor may be higher than the voltage of the power battery system in the fully charged state and the voltage of the energy battery system in the fully charged state.

In a second aspect, the present disclosure is directed to an electrical system configured to provide propulsive power to a rotor system of an eVTOL aircraft having a takeoff and landing power mode and a cruise power mode. The electrical system has a power battery system that includes a plurality of power cells and a power battery management system with a DC-to-DC converter. The electrical system also has an energy battery system that includes a plurality of energy cells and an energy battery management system with a DC-to-DC converter. The energy battery management system is in communication with the power battery management system. At least one electric motor is configured to drive the rotor system. A distribution system electrically couples the power battery system and the energy battery system to the at least one electric motor. In the takeoff and landing power mode, both the power battery system and the energy battery system provide electrical power to the at least one electric motor. In the cruise power mode, the energy battery system provides electrical power to the at least one electric motor and to the power battery system to recharge the power cells. A distribution voltage of the distribution system and an operating voltage of the at least one electric motor are higher than the voltage of the power battery system in the fully charged state and the voltage of the energy battery system in the fully charged state.

In a third aspect, the present disclosure is directed to an eVTOL aircraft having a takeoff and landing power mode and a cruise power mode. The eVTOL aircraft includes a rotor system having at least one electric motor. A power battery system includes a plurality of power cells and a power battery management system. An energy battery system includes a plurality of energy cells and an energy battery management system that is in communication with the power battery management system. A distribution system electrically couples the power battery system and the energy battery system to the at least one electric motor. In the takeoff and landing power mode, both the power battery system and the energy battery system provide electrical power to the at least one electric motor. In the cruise power mode, the energy battery system provides electrical power to the at least one electric motor and to the power battery system to recharge the power cells.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 7A-7D are schematic illustrations depicting various operating modes of a battery system having battery system optimization for use on an eVTOL aircraft in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
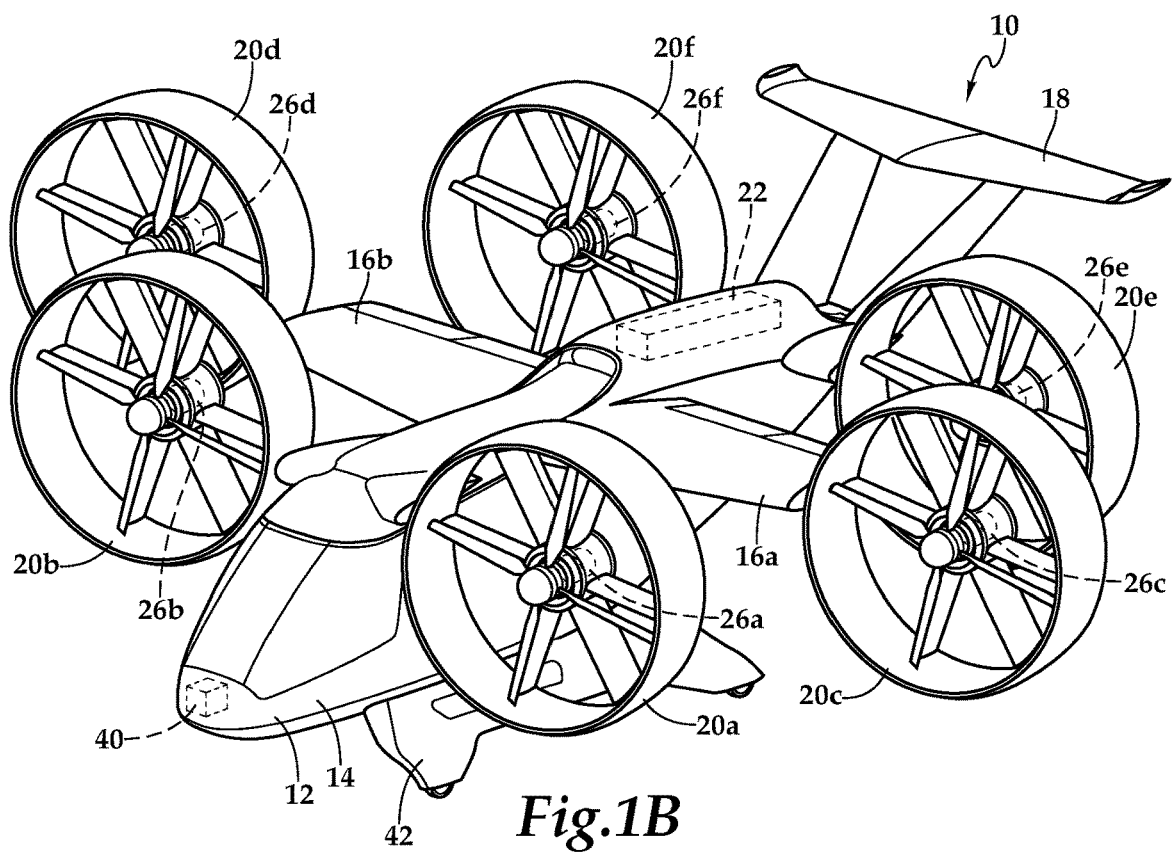
FIGS. 1A-1F are schematic illustrations of an eVTOL aircraft having a battery system with battery system optimization in accordance with embodiments of the present disclosure.
Figure 1A:
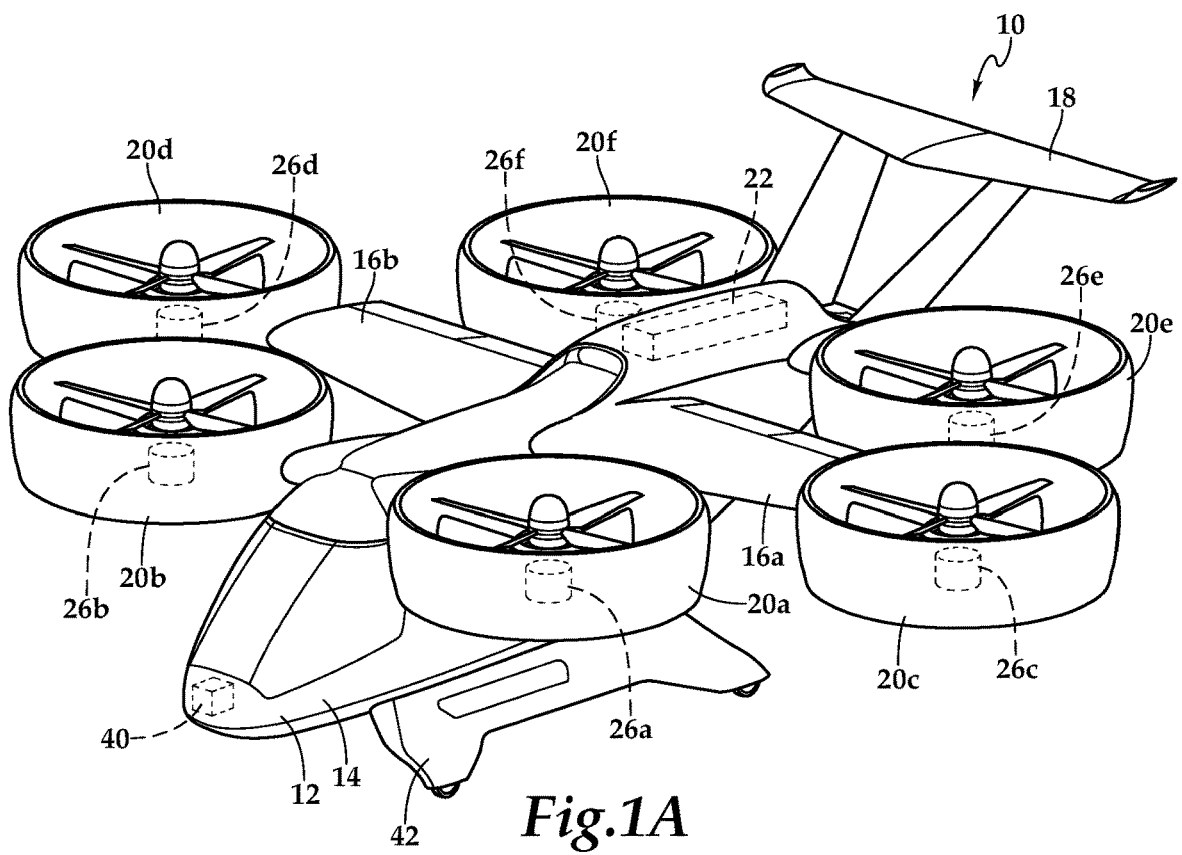
Figure 1D:
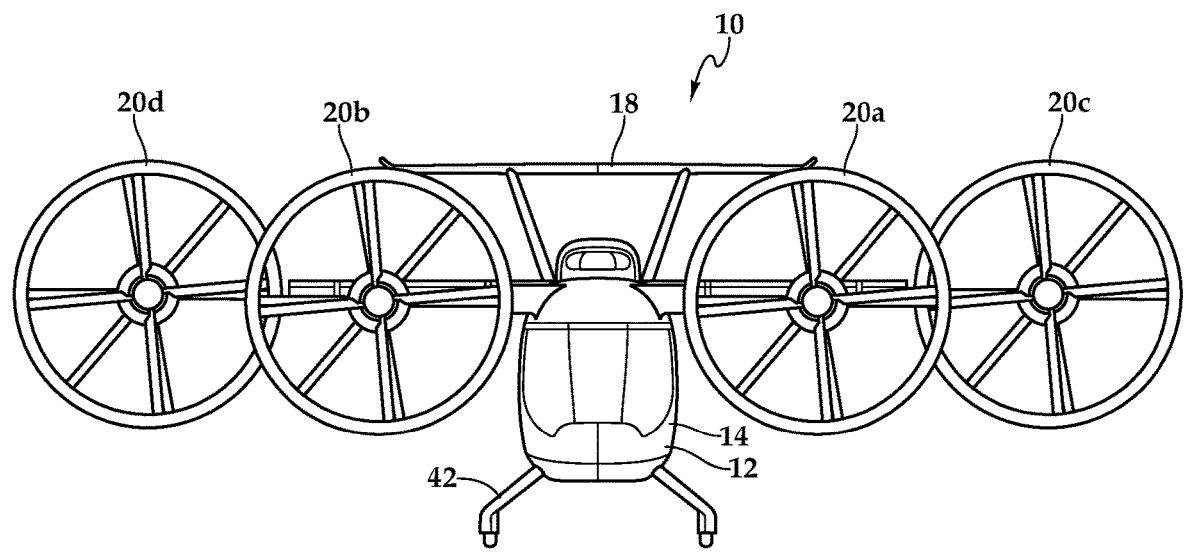
Figure 1C:
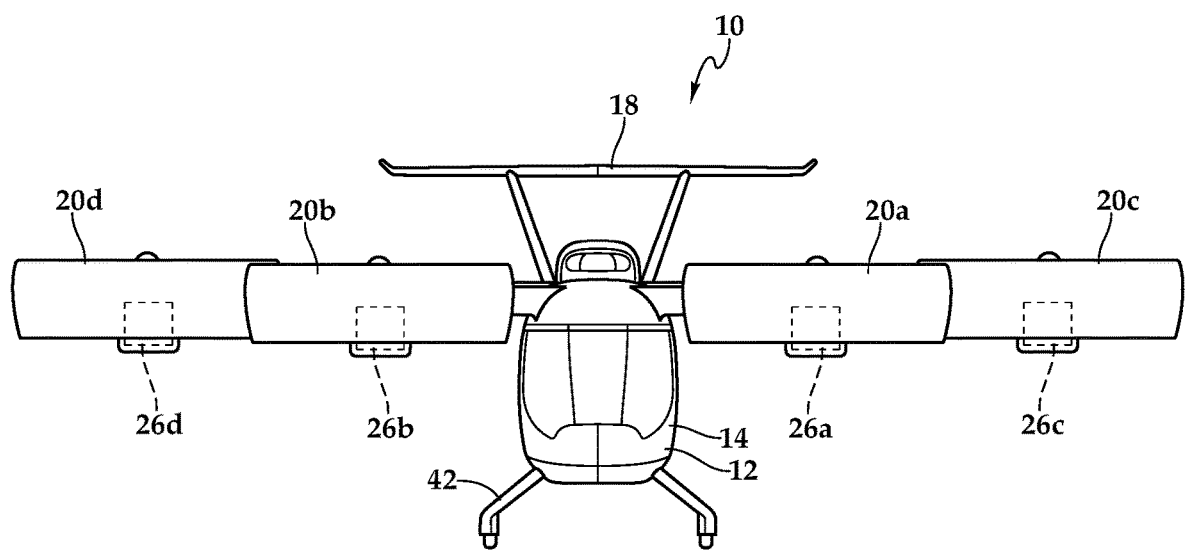
Figure 1F:
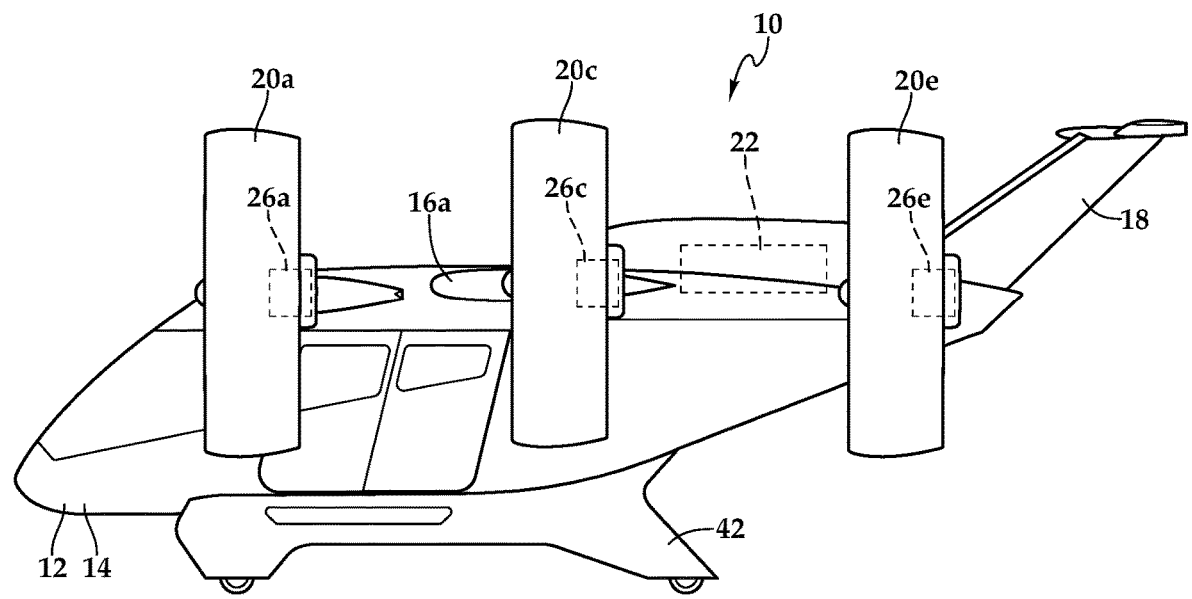
Figure 1E:
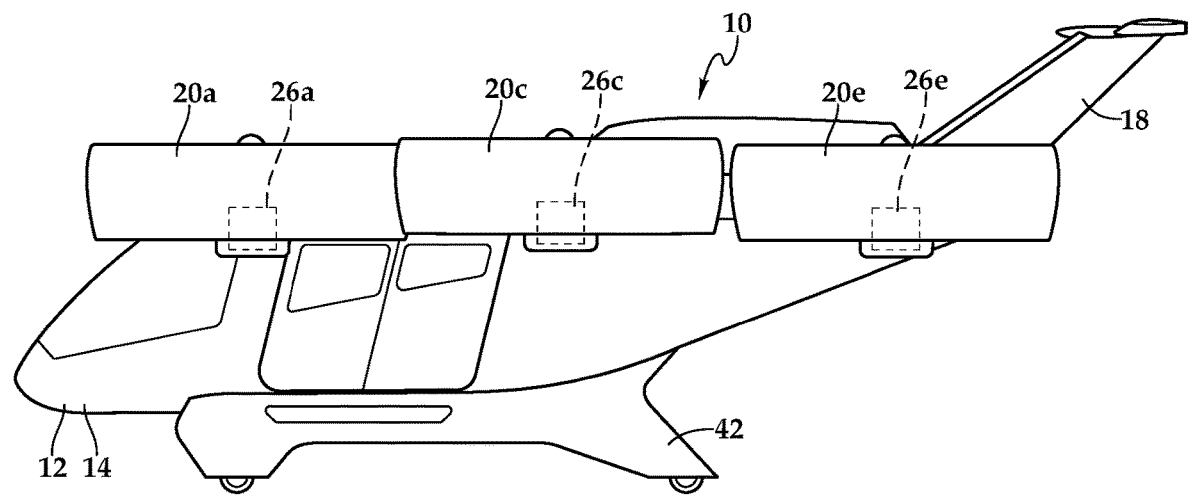

Referring to FIGS. 1A-1F in the drawings, a rotorcraft depicted as an electric vertical takeoff and landing (eVTOL) aircraft having a battery system with battery system optimization in accordance with embodiments of the present disclosure is schematically illustrated and generally designated 10. As illustrated, aircraft 10 is an air taxi that may be pilot operated, remotely operated or may operate autonomously to provide air taxi services. FIGS. 1A, 1C, 1E depict aircraft 10 in a VTOL orientation wherein the rotor system provides thrust-borne lift. FIGS. 1B, 1D, 1F depict aircraft 10 in a forward flight orientation wherein the rotor system provides forward thrust with the forward airspeed of aircraft 10 providing wing-borne lift enabling aircraft 10 to have a high speed and/or high endurance forward flight mode. In the illustrated embodiment, aircraft 10 has an airframe 12 including a fuselage 14, wings 16a, 16b and a tail assembly 18. Each of wings 16a, 16b has an airfoil cross-section that generates lift responsive to the forward airspeed of aircraft 10. In the illustrated embodiment, wings 16a, 16b are straight wings with a tapered leading edge. It will be appreciated, however, that wings 16a, 16b may be of a wide variety of shapes, sizes and configurations, depending upon the performance characteristics desired. In the illustrated embodiment, wings 16a, 16b include ailerons to aid in roll and/or pitch control of aircraft 10 during forward flight. Tail assembly 18 is depicted as having a pair of vertical stabilizers that may include one or more rudders to aid in yaw control of aircraft 10 during forward flight. In addition, tail assembly 18 has a horizontal stabilizer that may include one or more elevators to aid in pitch control of aircraft 10 during forward flight. It will be appreciated, however, that tail assembly 18 may be of a wide variety of shapes, sizes and configurations, depending upon the performance characteristics desired.

In the illustrated embodiment, the rotor system of aircraft 10 is depicted as six rotor assemblies. In other embodiments, the rotor system of an aircraft having a battery system with battery system optimization of the present disclosure could have other numbers of rotor assemblies both greater than or less than six. For example, a helicopter having a battery system with battery system optimization of the present disclosure could have a rotor system with a single rotor assembly, a tiltrotor aircraft having a battery system with battery system optimization of the present disclosure could have a rotor system with two proprotor assemblies, a quadcopter having a battery system with battery system optimization of the present disclosure could have a rotor system with four rotor assemblies or a multicopter having a battery system with battery system optimization of the present disclosure could have a rotor system with any number of rotor assemblies. In the illustrated embodiment, the rotor system of aircraft 10 includes a forward-port rotor assembly 20a, a forward-starboard rotor assembly 20b, a mid-port rotor assembly 20c, a mid-starboard rotor assembly 20d, an aft-port rotor assembly 20e and an aft-starboard rotor assembly 20f, which may be referred to collectively as rotor assemblies 20. Forward-port rotor assembly 20a and forward-starboard rotor assembly 20b are each rotatably mounted to a shoulder portion of fuselage 12 at a forward station thereof. Mid-port rotor assembly 20c is rotatably mounted on the outboard end of wing 16a. Mid-starboard rotor assembly 20d is rotatably mounted on the outboard end of wing 16b. Aft-port rotor assembly 20e and aft-starboard rotor assembly 20f are each rotatably mounted to a shoulder portion of fuselage 12 at an aft station thereof.

In the illustrated embodiment, rotor assemblies 20 are ducted rotor assemblies each having a four bladed rotor with variable pitch rotor blades operable for collective pitch control. In other embodiments, the rotor assemblies could be non-ducted or open rotor assemblies, the number of rotor blades could be either greater than or less than four and/or the rotor blades could have a fixed pitch. Rotor assembly 20a includes at least one variable speed electric motor 26a, rotor assembly 20b includes at least one variable speed electric motor 26b, rotor assembly 20c includes at least one variable speed electric motor 26c, rotor assembly 20d includes at least one variable speed electric motor 26d, rotor assembly 20e includes at least one variable speed electric motor 26e and rotor assembly 20f includes at least one variable speed electric motor 26f. The electric motors 26a-26f associated with rotor assemblies 20 may be collectively referred to as electric motors 26. Each of electric motors 26 may have a speed controller or other modulating device operably associated therewith that is configured to provide variable speed control over a wide range of rotor speeds.

When aircraft 10 is operating in the VTOL orientation and supported by thrust-borne lift, rotor assemblies 20 each have a generally horizontal orientation such that the rotors are rotating in generally in the same horizontal plane, as best seen in FIGS. 1C, 1E. When aircraft 10 is operating in the forward flight orientation and supported by wing-borne lift, rotor assemblies 20 each have a generally vertical orientation with the forward rotors rotating generally in a forward-vertical plane, the mid rotors rotating generally in a mid-vertical plane and the aft rotors rotating generally in an aft-vertical plane, as best seen in FIG. 1F. Transitions between the VTOL orientation and the forward flight orientation of aircraft 10 are achieved by changing the angular positions of rotor assemblies 20 between their generally horizontal orientations and their generally vertical orientations as discussed herein.

Aircraft 10 includes a battery system 22 that includes a power battery system and an energy battery system. As discussed herein, the power battery system includes a plurality of power cells and a power battery management system. The energy battery system includes a plurality of energy cells and an energy battery management system that is in communication with the power battery management system. The power battery system of aircraft 10 includes, for example, an array of battery cells with a high power rating that are configured to supply a high instantaneous power output for use during high power demand maneuvers such as takeoff, hover, landing, certain mid-flight operations, emergency operations and the like, which may be referred to as the takeoff and landing power mode of aircraft 10. The power cells may also be configured for rapid charging following a discharge event. Examples of battery chemistry for use in the power cells include lithium manganese oxide, lithium nickel manganese oxide, lithium iron phosphate and lithium titanate oxide. The energy battery system of aircraft 10 includes, for example, an array of battery cells with a high energy rating or high capacity that are configured to store a significant amount of energy and supply power over an extended period of time but at a lower maximum power level such as during the cruise phase or forward flight portion of a mission, which may be referred to as the cruise power mode of aircraft 10. Examples of battery chemistry for use in the energy cells include lithium cobalt oxide, lithium nickel manganese oxide, lithium nickel manganese cobalt oxide, lithium nickel cobalt aluminum oxide, lithium sulfur and lithium metal. In battery system 22, the energy cells having the higher energy-to-power ratio are used to charge the power cells having the lower energy-to-power ratio during cruise power mode operations such that the power cells are recharged for subsequent takeoff and landing power mode operations. The energy battery system can be used in combination with the power battery system during the takeoff and landing power mode.

Aircraft 10 has a fly-by-wire control system that includes a flight control system 40 that is preferably a redundant digital flight control system including multiple independent flight control computers. Flight control system 40 preferably includes non-transitory computer readable storage media including a set of computer instructions executable by one or more processors for controlling the operation of aircraft 10. Flight control system 40 may be implemented on one or more general-purpose computers, special purpose computers or other machines with memory and processing capability. Flight control system 40 may include one or more memory storage modules including random access memory, non-volatile memory, removable memory or other suitable memory entity. Flight control system 40 may be a microprocessor-based system operable to execute program code in the form of machine-executable instructions. Flight control system 40 may be connected to other computer systems via a suitable communication network that may include both wired and wireless connections.

Flight control system 40 communicates via a wired communications network within airframe 12 with battery system 22 and the electronics nodes of each rotor assembly 20. Flight control system 40 receives sensor data from and sends flight command information to rotor assemblies 20 such that each rotor assembly 20 may be individually and independently controlled and operated. For example, flight control system 40 is operable to individually and independently control the rotor speed and the collective pitch of each rotor assembly 20 as well as the angular position of each rotor assembly 20. Flight control system 40 may autonomously control some or all aspects of flight operations for aircraft 10. Flight control system 40 is also operable to communicate with remote systems, such as a ground station via a wireless communications protocol. The remote system may be operable to receive flight data from and provide commands to flight control system 40 to enable remote flight control over some or all aspects of flight operations for aircraft 10. In addition, aircraft 10 may be pilot operated such that a pilot interacts with a pilot interface that receives flight data from and provide commands to flight control system 40 to enable onboard pilot control over some or all aspects of flight operations for aircraft 10.

Aircraft 10 includes a landing gear 42 for ground operations. Landing gear 42 may include passively operated pneumatic landing struts or actively operated landing struts. In the illustrated embodiment, landing gear 42 includes a plurality of wheels that enable aircraft 10 to perform ground maneuvers. Landing gear 42 may include a passive brake system, an active brake system such as an electromechanical braking system and/or a manual brake system to facilitate parking as required during ground operations and/or passenger ingress and egress.

Figure 2A:
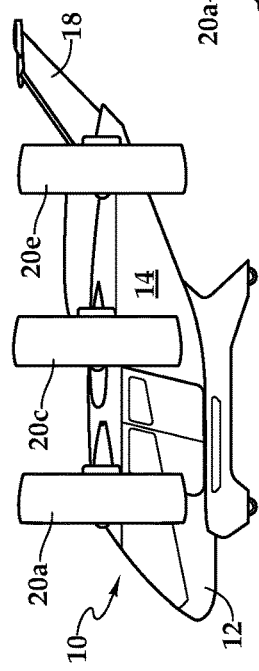
FIGS. 2A-2H are schematic illustrations of an eVTOL aircraft having a battery system with battery system optimization engaging in a sequential flight operating scenario in accordance with embodiments of the present disclosure.

Referring additionally to FIGS. 2A-2H in the drawings, a sequential flight-operating scenario of aircraft 10 is depicted. As best seen in FIG. 2A, aircraft 10 is positioned on a surface prior to takeoff. When aircraft 10 is ready for a mission, flight control system 40 commences operations to provide flight control to aircraft 10 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne lift and thrust-borne lift.

Figure 2B:
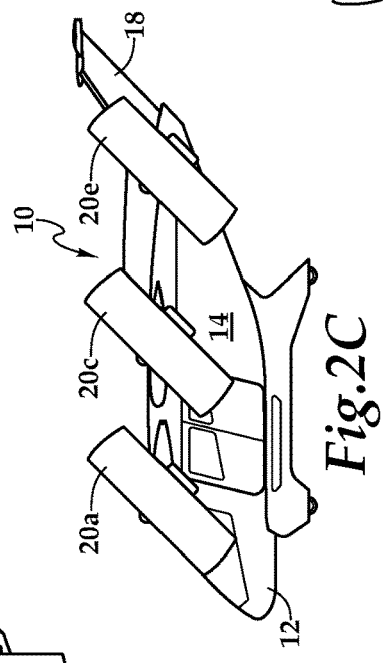

As best seen in FIG. 2B, aircraft 10 has performed a vertical takeoff and is engaged in thrust-borne lift. As illustrated, the rotors of each rotor assembly 20 are rotating in the same horizontal plane forming a two-dimensional distributed thrust array of six rotor assemblies. As the longitudinal axis and the lateral axis of aircraft 10 are both in the horizontal plane, aircraft 10 has a level flight attitude. During hover, flight control system 40 may utilize the individual variable speed control capability of rotor assemblies 20 to control flight dynamics to maintain hover stability and to provide pitch, roll and yaw authority for aircraft 10. As takeoff and hover are high power demand maneuvers, battery system 22 preferably utilizes a combination of the power battery system together with the energy battery system to provide the required propulsive power for rotor assemblies 20.

Figure 2C:
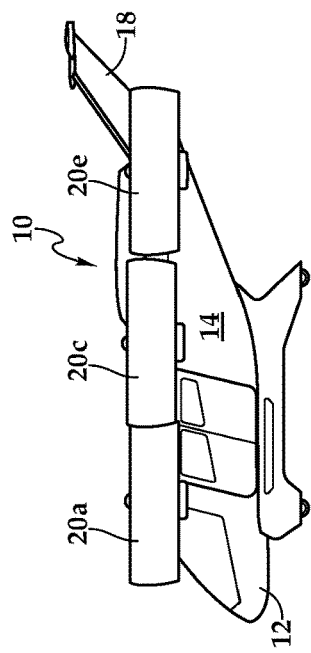
Figure 2D:
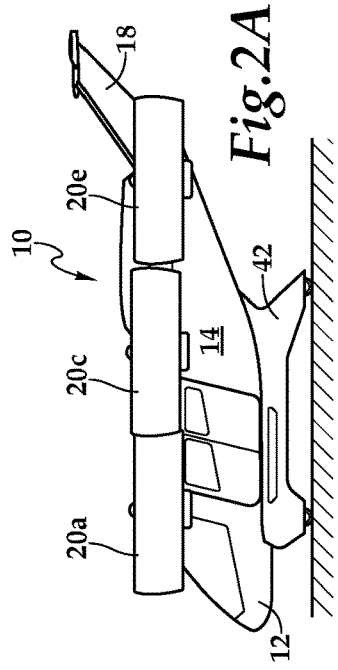
Figure 2E:
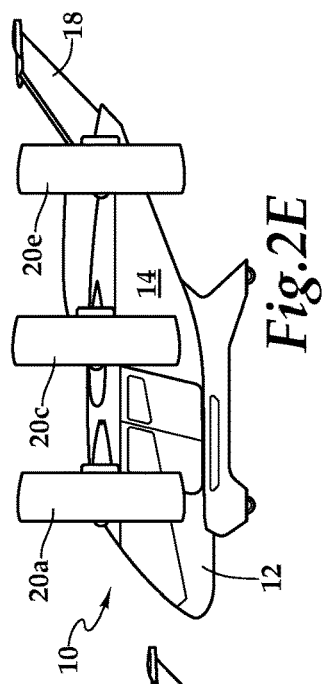

After vertical assent to the desired elevation, aircraft 10 may begin the transition from thrust-borne lift to wing-borne lift. As best seen from the progression of FIGS. 2B-2D, the angular positions of rotor assemblies 20 are changed by a pitch down rotation to transition aircraft 10 from the VTOL orientation toward the forward flight orientation. As seen in FIG. 2C, rotor assemblies 20 have been collectively inclined about forty-five degrees pitch down. In the conversion orientations of aircraft 10, a portion of the thrust generated by rotor assemblies 20 provides lift while a portion of the thrust generated by rotor assemblies 20 urges aircraft 10 to accelerate in the forward direction such that the forward airspeed of aircraft 10 increases allowing wings 16a, 16b to offload a portion and eventually all of the lift requirement from rotor assemblies 20. As best seen in FIG. 2D, rotor assemblies 20 have been collectively inclined about ninety degrees pitch down such that the rotors are rotating in vertical planes providing forward thrust for aircraft 10 with wings 16a, 16b providing lift. Even though the conversion from the VTOL orientation to the forward flight orientation of aircraft 10 has been described as progressing with collective pitch down rotation of rotor assemblies 20, in other implementation, all rotor assemblies 20 need not be operated at the same time or at the same rate.

As forward flight with wing-borne lift requires significantly less thrust than VTOL flight with thrust-borne lift, the operating speed of some or all of rotor assemblies 20 may be reduced particularly in embodiments having collective pitch control. In certain embodiments, some of rotor assemblies 20 of aircraft 10 could be shut down during forward flight. As cruise in forward flight is a lower power demand operation, battery system 22 utilizes the energy battery system to provide the required propulsive power for rotor assemblies 20 and to charge the power cells of the power battery system such that the power cells are suitably recharged for subsequent maneuvers in the takeoff and landing power mode including emergency maneuvers.

Figure 2F:
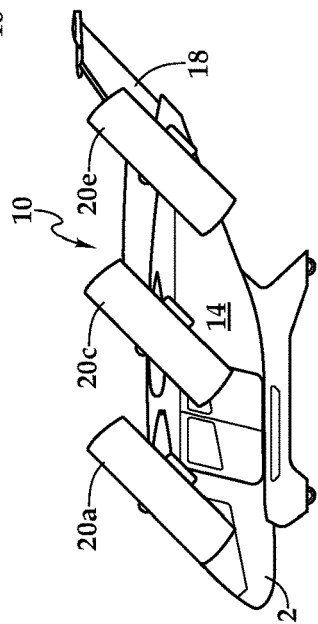
Figure 2G:
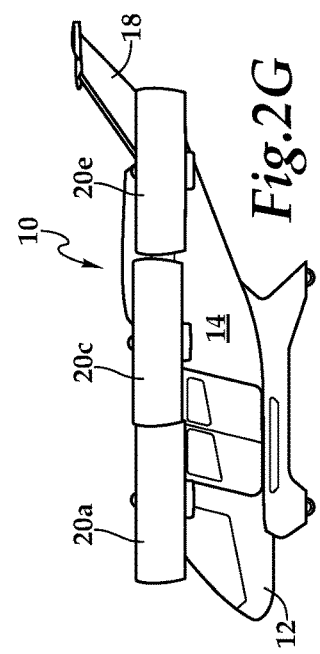
Figure 2H:
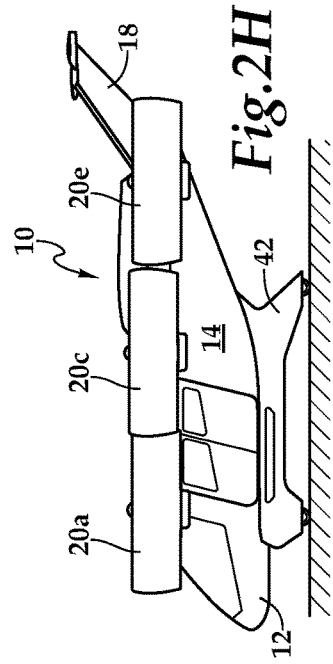

As aircraft 10 approaches its destination, aircraft 10 may begin its transition from wing-borne lift to thrust-borne lift. As best seen from the progression of FIGS. 2E-2G, the angular positions of rotor assemblies 20 are changed by a pitch up rotation to transition aircraft 10 from the forward flight orientation toward the VTOL orientation. As seen in FIG. 2F, rotor assemblies 20 have been collectively inclined about forty-five degrees pitch up. In the conversion orientations of aircraft 10, a portion of the thrust generated by rotor assemblies 20 begins to provide lift for aircraft 10 as the forward airspeed decreases and the lift producing capability of wings 16a, 16b decreases. As best seen in FIG. 2G, rotor assemblies 20 have been collectively inclined about ninety degrees pitch up such that the rotors are rotating in the horizontal plane providing thrust-borne lift for aircraft 10. Even though the conversion from the forward flight orientation to the VTOL orientation of aircraft 10 has been described as progressing with collective pitch up rotation of rotor assemblies 20, in other implementation, all rotor assemblies 20 need not be operated at the same time or at the same rate. Once aircraft 10 has completed the transition to the VTOL orientation, aircraft 10 may commence its vertical descent to a surface. As hover and landing are high power demand maneuvers, battery system 22 preferably utilizes a combination of the power battery system together with the energy battery system to provide the required propulsive power for rotor assemblies 20. As best seen in FIG. 2H, aircraft 10 is landing at the destination location.

Figure 3:
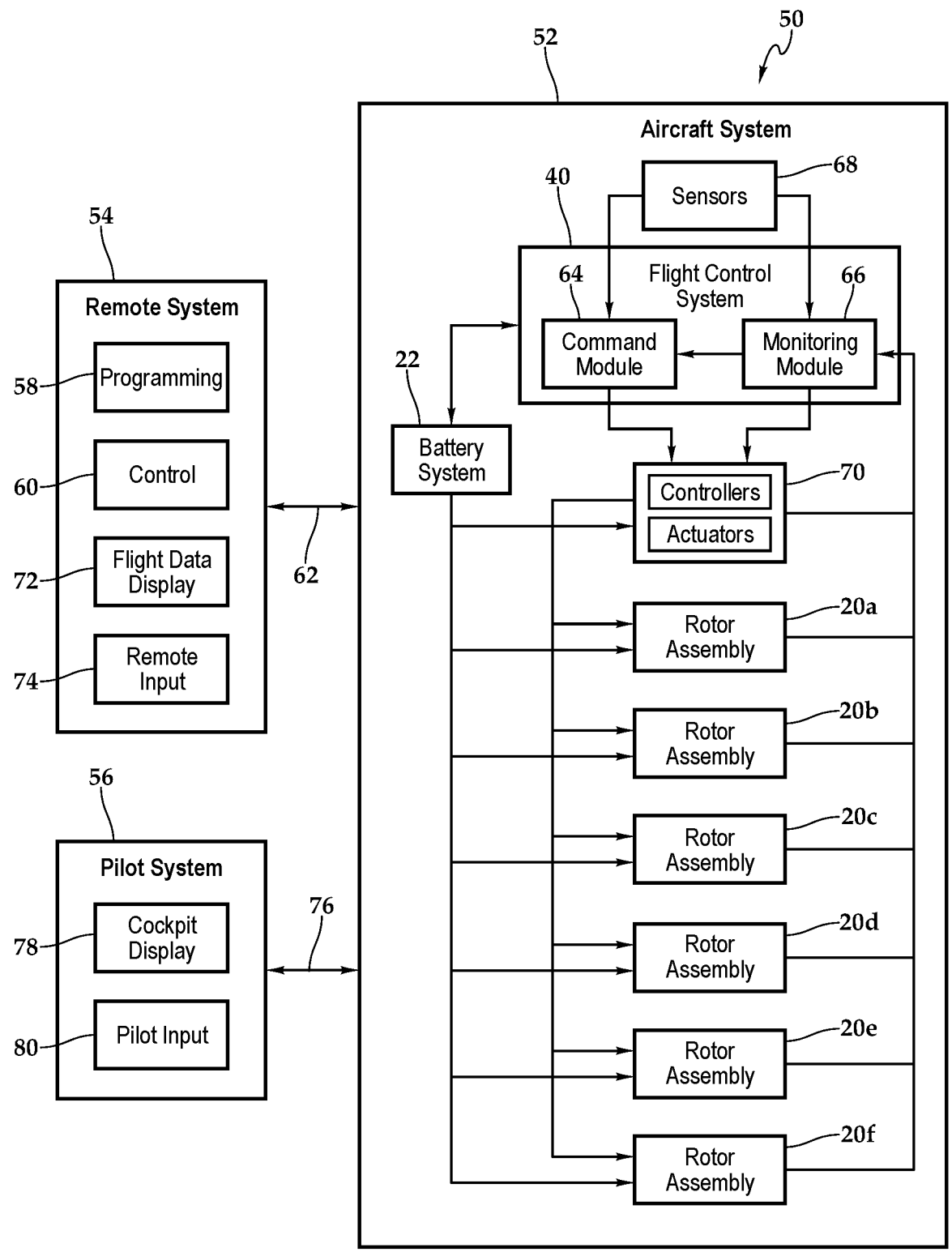
FIG. 3 is a block diagram of control systems for an eVTOL aircraft having a battery system with battery system optimization in accordance with embodiments of the present disclosure.

Referring additionally to FIG. 3 in the drawings, a block diagram depicts a control system 50 operable for use with aircraft 10 of the present disclosure. In the illustrated embodiment, system 50 includes three primary computer based subsystems; namely, an aircraft system 52, a remote system 54 and a pilot system 56. In some implementations, remote system 54 includes a programming application 58 and a remote control application 60. Programming application 58 enables a user to provide a flight plan and/or other mission information to aircraft 10 such that flight control system 40 may engage in autonomous control over aircraft 10. For example, programming application 58 may communicate with flight control system 40 over a wired or wireless communication channel 62 to provide a flight plan including, for example, a starting point, a trail of waypoints and an ending point such that flight control system 40 may use waypoint navigation during the mission.

In the illustrated embodiment, flight control system 40 is a computer based system that includes a command module 64 and a monitoring module 66. It is to be understood by those skilled in the art that these and other modules executed by flight control system 40 may be implemented in a variety of forms including hardware, software, firmware, special purpose processors and combinations thereof. Flight control system 40 receives input from a variety of sources including internal sources such as battery system 22, sensors 68, controllers and actuators 70 and rotor assemblies 20a-20f and external sources such as remote system 54 as well as global positioning system satellites or other location positioning systems and the like. During the various operating modes of aircraft 10 including VTOL mode, forward flight mode and transitions therebetween, command module 64 provides commands to controllers and actuators 70. These commands enable independent operation of each rotor assembly 20a-20f including rotor speed, collective pitch and angular position. Flight control system 40 receives feedback from controllers and actuators 70 and rotor assemblies 20a-20f. This feedback is processed by monitoring module 66 that can supply correction data and other information to command module 64 and/or controllers and actuators 70. Sensors 68, such as vibration sensors, location sensors, attitude sensors, speed sensors, environmental sensors, fuel sensors, temperature sensors and the like also provide information to flight control system 40 to further enhance autonomous control and power allocation capabilities.

Some or all of the autonomous control capability of flight control system 40 can be augmented or supplanted by remote flight control from, for example, remote system 54. Remote system 54 may include one or computing systems that may be implemented on general-purpose computers, special purpose computers or other machines with memory and processing capability. Remote system 54 may be a microprocessor-based system operable to execute program code in the form of machine-executable instructions. In addition, remote system 54 may be connected to other computer systems via a proprietary encrypted network, a public encrypted network, the Internet or other suitable communication network that may include both wired and wireless connections. Remote system 54 communicates with flight control system 40 via communication link 62 that may include both wired and wireless connections.

While operating remote control application 60, remote system 54 is configured to display information relating to one or more aircraft of the present disclosure on one or more flight data display devices 72. Remote system 54 may also include audio output and input devices such as a microphone, speakers and/or an audio port allowing an operator to communicate with other operators, a base station and/or a pilot onboard aircraft 10. The display device 72 may also serve as a remote input device 74 if a touch screen display implementation is used, however, other remote input devices, such as a keyboard or joystick, may alternatively be used to allow an operator to provide control commands to an aircraft being operated responsive to remote control.

Some or all of the autonomous and/or remote flight control of aircraft 10 can be augmented or supplanted by onboard pilot flight control from a pilot interface system 56 that includes one or more computing systems that communicate with flight control system 40 via one or more wired communication channels 76. Pilot system 56 preferably includes one or more cockpit display devices 78 configured to display information to the pilot. Cockpit display device 78 may be configured in any suitable form including, for example, a display panel, a dashboard display, an augmented reality display or the like. Pilot system 56 may also include audio output and input devices such as a microphone, speakers and/or an audio port allowing an onboard pilot to communicate with, for example, air traffic control. Pilot system 56 also includes a plurality of user interface devices 80 to allow an onboard pilot to provide control commands to aircraft 10 including, for example, a control panel with switches or other inputs, mechanical control devices such as steering devices or sticks as well as other control devices.

Figure 4:
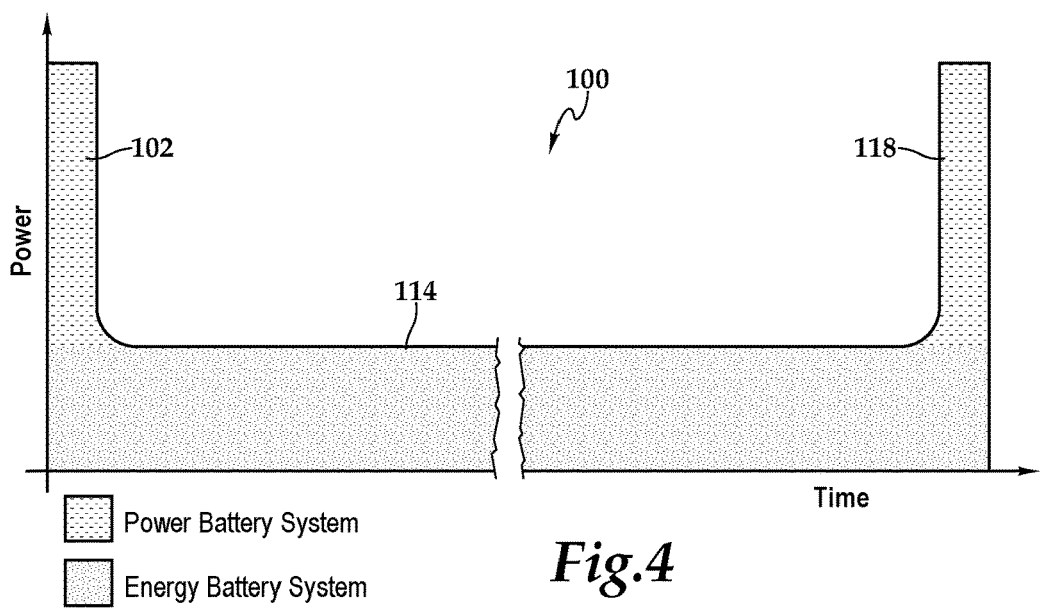
FIG. 4 is a power consumption diagram for an eVTOL aircraft having a battery system with battery system optimization during a typical flight in accordance with embodiments of the present disclosure.
Figure 5A:
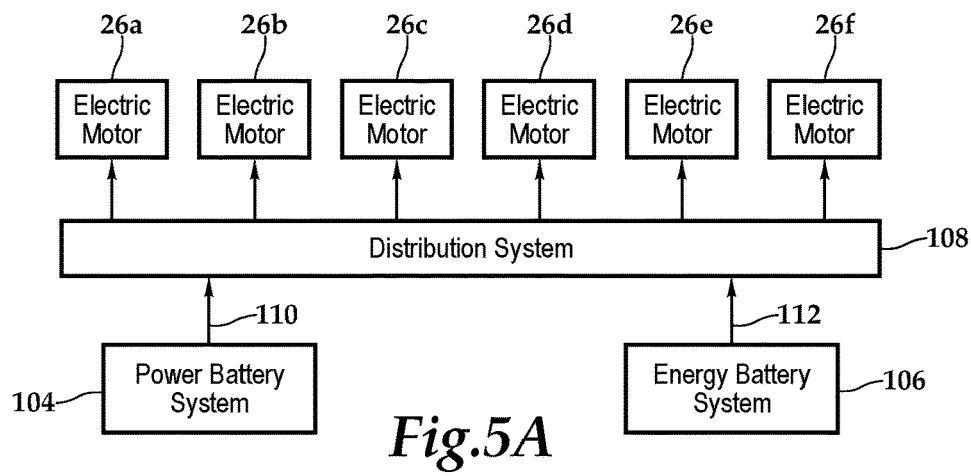
FIGS. 5A-5B are block diagrams depicting an electrical architecture for an eVTOL aircraft in two power demand modes in accordance with embodiments of the present disclosure.

Referring now to FIG. 4 of the drawings, a power consumption curve for a typical flight of aircraft 10 is depicted as a power versus time graph 100. As discussed herein, the initial phase of flight for an eVTOL aircraft such as aircraft 10 includes performing a vertical takeoff and climb as well as a hover in some instances. These operations are high power demand maneuvers that require significant instantaneous propulsive power. In graph 100, this initial segment of the flight with aircraft 10 in the takeoff and landing power mode is denoted as flight segment 102. As illustrated, during flight segment 102, the energy battery system of aircraft 10 is providing a portion of the total power requirement with the power battery system of aircraft 10 providing the remainder of the total power requirement. This power profile is represented in FIG. 5A in which a power battery system 104 and an energy battery system 106 are each providing electric power to a distribution system 108, as indicated by arrows 110, 112. Distribution system 108 delivers the electric power to the power consumers of aircraft 10 depicted as including electric motors 26a-26f of rotor assemblies 20, as indicated by the arrows therebetween. Distribution system 108 may include one or more electrical buses, electrical wiring, inverters and other electrical components known to those having ordinary skill in the art.

Figure 5B:
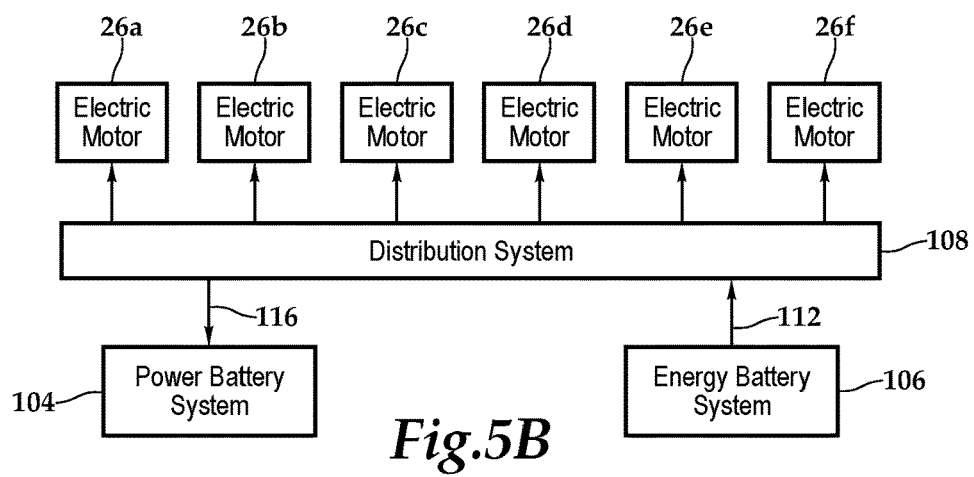

After aircraft 10 has completed the vertical takeoff and climb maneuver and has converted to the forward flight orientation for forward cruising, aircraft 10 requires significantly less propulsive power. In graph 100, this second segment of the flight with aircraft 10 in the cruise power mode is denoted as flight segment 114. As illustrated, during flight segment 114, the energy battery system of aircraft 10 is providing the total power requirement (100%) for aircraft 10 with the power battery system providing none (0%) of the total power requirement. This power profile is represented in FIG. 5B in which energy battery system 106 is providing electric power to distribution system 108, as indicated by arrow 112. Distribution system 108 delivers the electric power to electric motors 26a-26f of rotor assemblies 20, as indicated by the arrows therebetween. In addition, distribution system 108 delivers electric power to power battery system 104, as indicated by arrow 116. In this manner, energy battery system 106 recharges power battery system 104 during flight segment 114 when only cruise power is required.

As aircraft 10 approaches its destination, aircraft 10 converts from the forward flight orientation back to the VTOL orientation and engages in a vertical descent and landing maneuver as well as a hover maneuver in some instances. These operations are high power demand maneuvers that require significant instantaneous propulsive power. In graph 100, this third segment of the flight with aircraft 10 in the takeoff and landing power mode is denoted as flight segment 118. As illustrated, during flight segment 118, the energy battery system of aircraft 10 is providing a portion of the total power requirement with the power battery system of aircraft 10 providing the remainder of the total power requirement. This power profile is represented in FIG. 5A in which power battery system 104 and energy battery system 106 are providing electric power to distribution system 108, as indicated by arrows 110, 112. Distribution system 108 delivers the electric power to electric motors 26a-26f of rotor assemblies 20, as indicated by the arrows therebetween.

In the illustrated example, the power provided by the power battery system is greater than the power provided by the energy battery system during flight segments 102, 118. In other implementations, the power provided by the power battery system could be the same as or less than the power provided by the energy battery system. In addition, even though the power provided by the power battery system is depicted as being approximately two times greater than the power provided by the energy battery system during flight segments 102, 118, it should be understood by those having ordinary skill in the art that the power ratio of the power provided by the power battery system to the power provided by the energy battery system could be greater than 2 to 1 such as 3 to 1, 4 to 1, 6 to 1 or more or the power ratio could be less than 2 to 1 such as 1 to 1, 0.5 to 1 or lower. Also, even though the power provided by the energy battery system is depicted as being substantially constant during flight segments 102, 114, 118, it should be understood by those having ordinary skill in the art that the power provided by the energy battery system in the cruise power mode could be either greater than or less than the power provided by the energy battery system in the takeoff and landing power mode.

In this illustrated embodiment, the energy battery system has been sized and designed to provide the required power for all the electrical requirements of aircraft 10 in the cruise power mode based upon the efficiencies of the components and other factors that are well known to those having ordinary skill in the art. The power battery system has been sized and designed to provide the required boost in power for the instantaneous peak power requirements in the takeoff and landing power mode based upon the efficiencies of the components and other factors that are well known to those having ordinary skill in the art. In other embodiments, the power battery system could be sized and designed to meet the total instantaneous peak power requirements for the takeoff and landing power mode. The specific power sharing regime of the power battery system and the energy battery system for a particular implementation and/or a particular maneuver will be determined, for example, by one or more power management modules associated with battery system 22 with the power sharing regime ranging between the power battery system exclusively providing power, the energy battery system exclusively providing power or any jointly powered scenario therebetween.

Figure 6A:
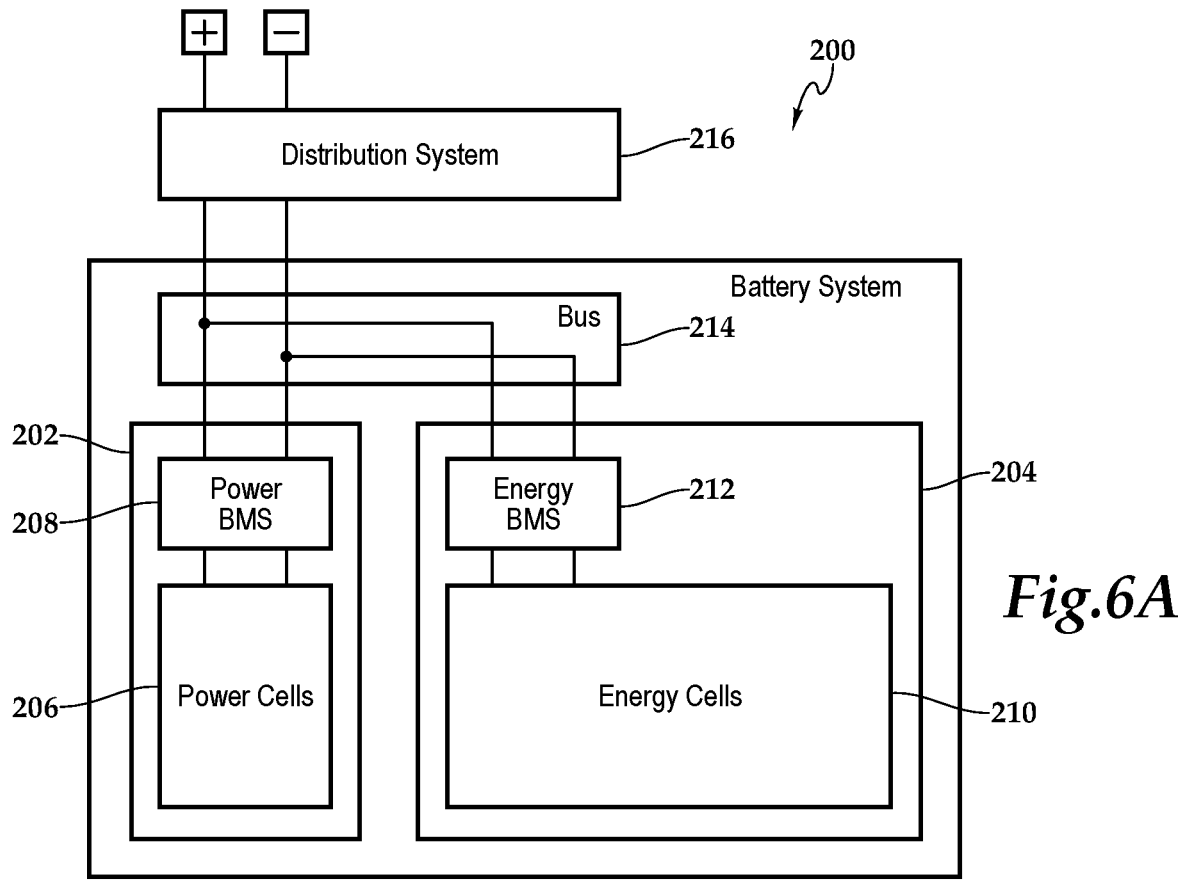
FIGS. 6A-6B are block diagrams depicting battery systems having battery system optimization for use on an eVTOL aircraft in accordance with embodiments of the present disclosure.
Figure 6B:
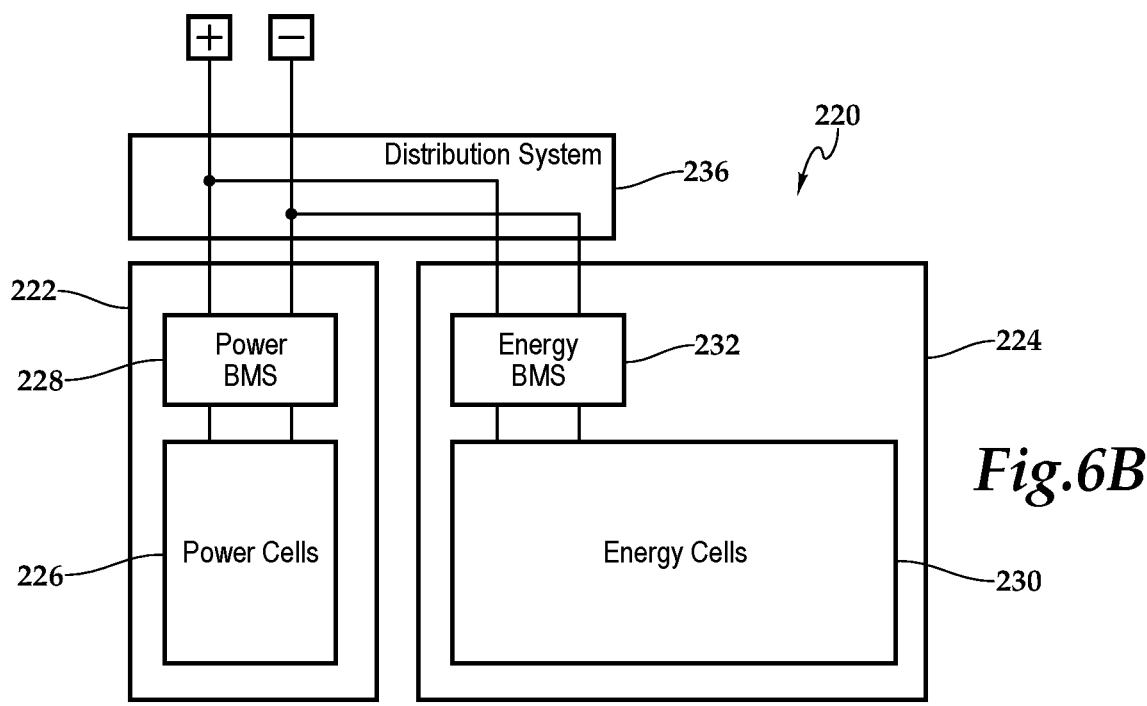

Referring additionally to FIGS. 6A-6B in the drawings, block diagrams depict two embodiments of a battery system including a power battery system and an energy battery system having battery system optimization of the present disclosure. As discussed herein, having both a power battery system and an energy battery system on aircraft 10 enables improved power management over both transient high power demand requirements and sustained low power demand requirements. In FIG. 6A, a battery system 200 is contained within a single housing which tends to provide a compact package and be weight efficient. As illustrated, battery system 200 includes a power battery system 202 and an energy battery system 204. Power battery system 202 includes a plurality of power cells 206 and a power battery management system 208 that provides, for example, short circuit protection, over-charge protection, over-discharge protection and over-current protection to power cells 206. In addition, power battery management system 208 calculates the state of charge of power cells 206 and monitors the health and safety of power cells 206. The battery voltage of power cells 206 in a fully charged state may be between 550 volts and 800 volts or other suitable voltage. Power cells 206 are configured to have a high power rating, to supply a high instantaneous power output for use during the takeoff and landing power mode of aircraft 10 and to enable rapid charging following a discharge event.

Energy battery system 204 includes a plurality of energy cells 210 and an energy battery management system 212 that provides, for example, short circuit protection, over-discharge protection and over-current protection to energy cells 210. In addition, energy battery management system 212 calculates the state of charge of energy cells 210 and monitors the health and safety of energy cells 210. The battery voltage of energy cells 210 in a fully charged state may be between 550 volts and 800 volts or other suitable voltage. Energy cells 210 are configured to have a high energy rating or high capacity, to store a significant amount of energy and to supply power over an extended period of time for use during the cruise power mode of aircraft 10.

Battery system 200 includes a bus 214 that couples power battery system 202 and energy battery system 204 such that power battery management system 208 and energy battery management system 212 can coordinate charging and discharging operations of power cells 206 and energy cells 210. For example, during flight segment 202 (see FIG. 4) when aircraft 10 is in the takeoff and landing power mode, power battery management system 208 enables power cells 206 to supply current to distribution system 216 and energy battery management system 212 enables energy cells 210 to supply current to distribution system 216. In addition, during flight segment 114 (see FIG. 4) when aircraft 10 is in the cruise mode, power battery management system 208 enables power cells 206 to receive current from bus 214 while energy battery management system 212 enables energy cells 210 to supply current to distribution system 216 as well as to power cells 206 for recharging. Also, during flight segment 114 (see FIG. 4) when aircraft 10 is in the cruise mode, power battery management system 208 shuts off the current supply to power cells 206 when recharging is complete while energy battery management system 212 enables energy cells 210 to supply current to distribution system 216. In another example, during an emergency situation if power from energy battery system 204 is interrupted or diminished, power battery management system 208 enables power cells 206 to supply current to distribution system 216.

In FIG. 6B, a battery system 220 includes a power battery system 222 and an energy battery system 224 that are separate components which tends to provide modularity and scalability to battery system 220. Power battery system 222 includes a plurality of power cells 226 and a power battery management system 228 that provides, for example, short circuit protection, over-charge protection, over-discharge protection and over-current protection to power cells 226. In addition, power battery management system 228 calculates the state of charge of power cells 226 and monitors the health and safety of power cells 226. The battery voltage of power cells 226 in a fully charged state may be between 550 volts and 800 volts or other suitable voltage. Power cells 226 are configured to have a high power rating, to supply a high instantaneous power output for use during the takeoff and landing power mode of aircraft 10 and to enable rapid charging following a discharge event.

Energy battery system 224 includes a plurality of energy cells 230 and an energy battery management system 232 that provides, for example, short circuit protection, over-discharge protection and over-current protection to energy cells 230. In addition, energy battery management system 232 calculates the state of charge of energy cells 230 and monitors the health and safety of energy cells 230. The battery voltage of energy cells 230 in a fully charged state may be between 550 volts and 800 volts or other suitable voltage. Energy cells 230 are configured to have a high energy rating or high capacity, to store a significant amount of energy and to supply power over an extended period of time for use during the cruise power mode of aircraft 10. In the illustrated embodiment, power battery system 222 and energy battery system 224 are coupled together via distribution system 236 such that power battery management system 228 and energy battery management system 232 can coordinate charging and discharging operations of power cells 226 and energy cells 230, as discussed herein.

Referring now to FIGS. 7A-7D in the drawings, a battery system 300 including a power battery system 302 and an energy battery system 304 having battery system optimization of the present disclosure is schematically illustrated in various operating modes. Power battery system 302 includes a plurality of power cells 306 and a power battery management system 308 that provides protections and services for power cells 306. Energy battery system 304 includes a plurality of energy cells 310 and an energy battery management system 312 that provides protections and services for energy cells 310. In the illustrated embodiment, power battery management system 308 includes a controller 314 that manages the discharging and charging of power cells 306. Controller 314 may include a switch configured to connect and disconnect electrical communication with power cells 306 to selectively allow and prevent discharging and charging of power cells 306. For example, the switch may be a relay switch such as an electromechanical relay switch or a solid state relay switch including PWM relay switches. Alternatively or additionally, the switch may include a transistor such as a MOSFET switch including silicon or silicon carbide MOSFET switches or a bipolar transistor switch such as an IGBT switch. As another alternative, the switch may be in series with a diode and/or in parallel with a resistor to limit current to a discrete level. In general, controller 314 regulates the inflow of current into power cells 306 when the voltage of energy cells 310 is higher than the voltage of power cells 306. For example, controller 314 will open the switch to prevent over-charging when power cells 306 are fully charged. In addition, controller 314 may reduce the current flowing to power cells 306 during recharging to prevent drooping in the distribution voltage. Upon entering the takeoff and landing power mode of aircraft 10, controller 314 will close the switch when the distribution voltage droops to the same potential as power battery system 302 thereby preventing excessive current spike. Energy battery management system 312 may include an optional controller 316 that manages the discharging and charging of energy cells 310. Controller 316 may include components and may operate in a manner similar to controller 314 of power battery management system 308.

FIG. 7A represents battery system 300 when aircraft 10 is in the takeoff and landing power mode. As illustrated, current from power battery system 302, represented by outflow arrow 318, and current from energy battery system 304, represented by outflow arrow 320, combine to provide the required propulsive power for aircraft 10, as represented by outflow arrow 322. FIG. 7B represents battery system 300 when aircraft 10 is in the cruise power mode during recharging of power cells 306. As illustrated, a portion of the current from energy battery system 304, represented by outflow arrow 324, provides the required propulsive power for aircraft 10, as represented by outflow arrow 326 and a portion of the current from energy battery system 304 recharges power cells 306, as represented by inflow arrow 328. FIG. 7C represents battery system 300 when aircraft 10 is in the cruise power mode once recharging of power cells 306 is complete. As illustrated, the current from energy battery system 304, represented by outflow arrow 330, provides the required propulsive power for aircraft 10, as represented by outflow arrow 332, with no current inflow or outflow from power battery system 302. FIG. 7D represents battery system 300 when aircraft 10 is in an emergency situation when power from energy battery system 304 has been interrupted. As illustrated, the current from power battery system 302, represented by outflow arrow 334, provides the required propulsive power for aircraft 10, as represented by outflow arrow 336, with no current inflow or outflow from energy battery system 304.

Referring now to FIGS. 8A-8D in the drawings, a battery system 400 including a power battery system 402 and an energy battery system 404 having battery system optimization of the present disclosure is schematically illustrated in various operating modes. Power battery system 402 includes a plurality of power cells 406 and a power battery management system 408 that provides protections and services for power cells 406. Energy battery system 404 includes a plurality of energy cells 410 and an energy battery management system 412 that provides protections and services for energy cells 410. In the illustrated embodiment, power battery management system 408 includes a controller 414 that includes a voltage regulator depicted as a DC-to-DC converter used to upconvert the voltage $V_P$ of power cells 406 to the desired distribution/operating voltage $V_O$ of the electrical architecture of aircraft 10 and to downconvert the distribution/operating voltage $V_O$ to the voltage $V_P$ of power cells 406 during recharging. For example, the voltage to power cells 406 when fully charged may be between 550 volts and 800 volts while the desired distribution voltage and/or operating voltage of electric motors 26 may be between 800 volts and 1500 volts. Likewise, energy battery management system 412 includes a controller 416 that includes a voltage regulator depicted as a DC-to-DC converter used to upconvert the voltage $V_E$ of energy cells 410 to the desired distribution/operating voltage $V_O$. For example, the voltage to energy cells 410 when fully charged may be between 550 volts and 800 volts while the desired distribution voltage and/or operating voltage of electric motors 26 may be between 800 volts and 1500 volts.

Figure 8A:
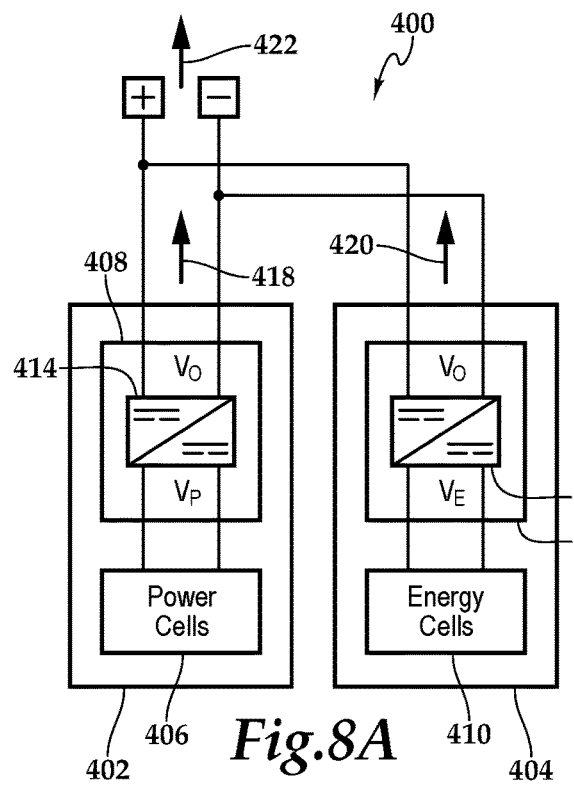
FIGS. 8A-8D are schematic illustrations depicting various operating modes of a battery system having battery system optimization for use on an eVTOL aircraft in accordance with embodiments of the present disclosure.
Figure 8B:
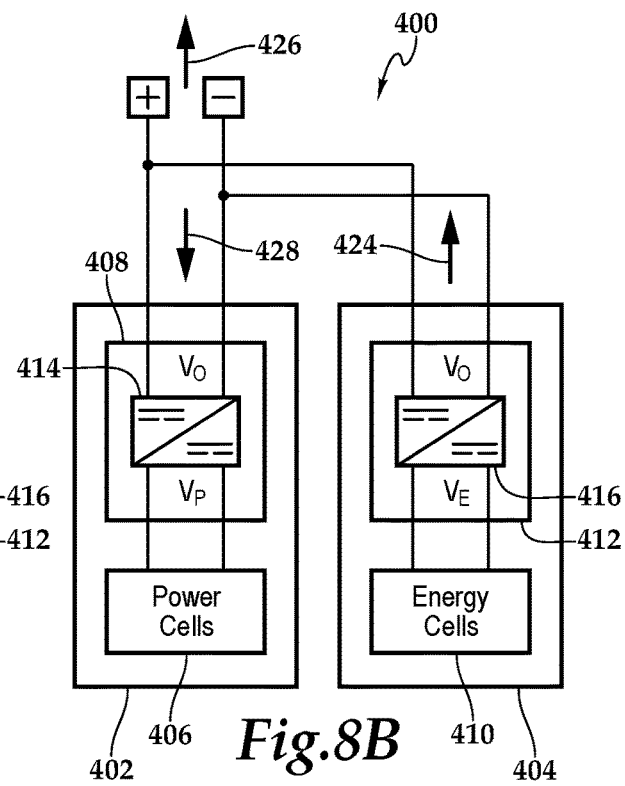
Figure 8C:
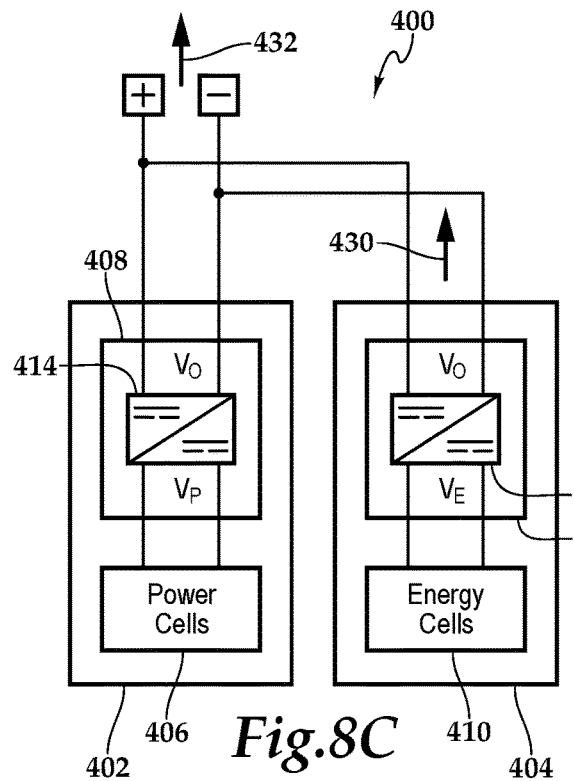
Figure 8D:
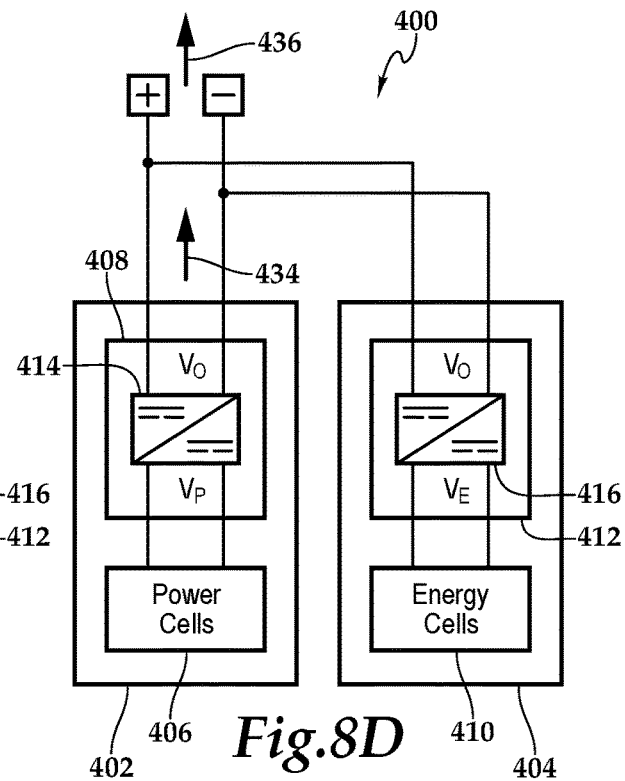

FIG. 8A represents battery system 400 when aircraft 10 is in the takeoff and landing power mode. As illustrated, current from power battery system 402, represented by outflow arrow 418, and current from energy battery system 404, represented by outflow arrow 420, combine to provide the required propulsive power for aircraft 10, as represented by outflow arrow 422. In this case, controller 414 of power battery management system 408 upconverts $V_P$ to $V_O$ and controller 416 of energy battery management system 412 upconverts $V_E$ to $V_O$. FIG. 8B represents battery system 400 when aircraft 10 is in the cruise power mode during recharging of power cells 406. As illustrated, a portion of the current from energy battery system 404, represented by outflow arrow 424, provides the required propulsive power for aircraft 10, as represented by outflow arrow 426 and a portion of the current from energy battery system 404 recharges power cells 406, as represented by inflow arrow 428. In this case, controller 414 of power battery management system 408 downconverts $V_O$ to $V_P$ and controller 416 of energy battery management system 412 upconverts $V_E$ to $V_O$. In this embodiment, it is noted that power cells 406 may be recharged to a voltage $V_P$ that exceeds the voltage $V_E$ of energy cells 410. FIG. 8C represents battery system 400 when aircraft 10 is in the cruise power mode once recharging of power cells 406 is complete. As illustrated, the current from energy battery system 404, represented by outflow arrow 430, provides the required propulsive power for aircraft 10, as represented by outflow arrow 432, with no current inflow or outflow from power battery system 402. In this case, controller 416 of energy battery management system 412 upconverts $V_E$ to $V_O$. FIG. 8D represents battery system 400 when aircraft 10 is in an emergency situation when power from energy battery system 404 has been interrupted. As illustrated, the current from power battery system 402, represented by outflow arrow 434, provides the required propulsive power for aircraft 10, as represented by outflow arrow 436, with no current inflow or outflow from energy battery system 404. In this case, controller 414 of power battery management system 408 upconverts $V_P$ to $V_O$.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An electrical system configured to provide propulsive power to a rotor system of an eVTOL aircraft having a takeoff and landing power mode and a cruise power mode, the electrical system comprising:
   a power battery system including a plurality of power cells and a power battery management system including a power battery DC-to-DC converter, the power cells having a power battery voltage;
   an energy battery system including a plurality of energy cells and an energy battery system including an energy battery DC-to-DC converter, the energy cells having an energy battery voltage, the energy battery management system in communication with the power battery management system;
   at least one electric motor configured to drive the rotor system, the electric motor having an operating voltage; and
   a distribution system electrically coupling the power battery system and the energy battery system to the at least one electric motor, the distribution system having a distribution voltage;
   wherein, the power battery system is connected in parallel to the energy battery system;
   wherein, in the takeoff and landing power mode, the energy battery DC-to-DC converter is configured to upconvert the energy battery voltage to the distribution voltage and the power battery DC-to-DC converter is configured to upconvert the power battery voltage to the distribution voltage so that both the power battery system and the energy battery system provide electrical power to the at least one electric motor; and
   wherein, in the cruise power mode, the energy battery DC-to-DC converter is configured to upconvert the energy battery voltage to the distribution voltage and the power battery DC-to-DC converter is configured to downconvert the distribution voltage to the power battery voltage so that the energy battery system provides electrical power to the at least one electric motor and to the power battery system to recharge the power cells.

2. The electrical system as recited in claim 1 wherein the power battery management system is configured to provide short circuit protection, over-charge protection, over-discharge protection and over-current protection to the power cells.

3. The electrical system as recited in claim 1 wherein the energy battery management system is configured to provide short circuit protection, over-discharge protection and over-current protection to the energy cells.

4. The electrical system as recited in claim 1 wherein the power battery management system further comprises a controller configured to allow discharge of the power cells during the takeoff and landing power mode and to selectively allow charging of the power cells during the cruise power mode.

5. The electrical system as recited in claim 4 wherein the controller further comprises a switch configured to selectively connect and disconnect electrical communication with the power cells.

6. The electrical system as recited in claim 5 wherein the switch further comprises an electromechanical switch.

7. The electrical system as recited in claim 5 wherein the switch further comprises a solid state switch.

8. The electrical system as recited in claim 1 wherein the energy battery management system further comprises a controller.

9. The electrical system as recited in claim 1 wherein a voltage of the power battery voltage system in a fully charged state is greater than a voltage of the energy battery voltage system in a fully charged state.

10. The electrical system as recited in claim 1 wherein, in the cruise power mode, the energy battery system provides electrical power to the power battery system to recharge the power cells when a voltage of the energy battery voltage system is greater than a voltage of the power battery voltage system.

11. The electrical system as recited in claim 1 wherein a voltage of the energy battery voltage system in a fully charged state is greater than a voltage of the power battery voltage system in a fully charged state.

12. The electrical system as recited in claim 1 wherein a the distribution voltage of the distribution system and an the operating voltage of the at least one electric motor are higher than a voltage of the power battery voltage system in a fully charged state and a voltage of the energy battery voltage system in a fully charged state.

13. An eVTOL aircraft having a takeoff and landing power mode and a cruise power mode, the eVTOL aircraft comprising:
- a rotor system having at least one electric motor, the electric motor having an operating voltage;
- a power battery system including a plurality of power cells and a power battery management system including a power battery DC-to-DC converter, the power cells having a power battery voltage;
- an energy battery system including a plurality of energy cells and an energy battery management system including an energy battery DC-to-DC converter, the energy cells having an energy battery voltage, the energy battery management system in communication with the power battery management system; and
- a distribution system electrically coupling the power battery system and the energy battery system to the at least one electric motor, the distribution system having a distribution voltage;
- wherein, the power battery system is connected in parallel to the energy battery system;
- wherein, in the takeoff and landing power mode, the energy battery DC-to-DC converter is configured to upconvert the energy battery voltage to the distribution voltage and the power battery DC-to-DC converter is configured to upconvert the power battery voltage to the distribution voltage such that both the power battery system and the energy battery system provide electrical power to the at least one electric motor; and
- wherein, in the cruise power mode, the energy battery DC-to-DC converter is configured to upconvert the energy battery voltage to the distribution voltage and the power battery DC-to-DC converter is configured to downconvert the distribution voltage to the power battery voltage so that the energy battery system provides electrical power to the at least one electric motor and to the power battery system to recharge the power cells.

14. The eVTOL aircraft as recited in claim 13 wherein the eVTOL aircraft is an air taxi configured for autonomous flight.

15. The eVTOL aircraft as recited in claim 13 wherein the power battery management system is configured to provide short circuit protection, over-charge protection, over-discharge protection and over-current protection to the power cells.

16. The eVTOL aircraft as recited in claim 13 wherein the energy battery management system is configured to provide short circuit protection, over-discharge protection and over-current protection to the energy cells.

17. The eVTOL aircraft as recited in claim 13 wherein the power battery voltage in a fully charged state is greater than the energy battery voltage in a fully charged state.

18. The eVTOL aircraft as recited in claim 13 wherein, in the cruise power mode, the energy battery system provides electrical power to the power battery system to recharge the power cells when the energy battery voltage is greater than the power battery voltage.

19. The eVTOL aircraft as recited in claim 13 wherein the energy battery voltage in a fully charged state is greater than the power battery voltage in a fully charged state.

20. The eVTOL aircraft as recited in claim 13 wherein the distribution voltage of the distribution system and the operating voltage of the at least one electric motor are higher than the power battery voltage in a fully charged state and the energy battery voltage in a fully charged state.

* * * * *